(12) United States Patent
Pappu et al.

(10) Patent No.: US 10,732,699 B2
(45) Date of Patent: Aug. 4, 2020

(54) REDUNDANCY IN DISTRIBUTION OF VOLTAGE-FREQUENCY SCALING PARAMETERS

(71) Applicant: Intel Corporation, Santa Clara, CA (US)

(72) Inventors: Lakshminarayana Pappu, Folsom, CA (US); Robert Milstrey, Folsom, CA (US); Amit K. Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 15/904,023

(22) Filed: Feb. 23, 2018

(65) Prior Publication Data
US 2019/0265771 A1  Aug. 29, 2019

(51) Int. Cl.
*G06F 1/32*   (2019.01)
*G06F 1/324*  (2019.01)
*G06F 9/4401* (2018.01)
*G06F 1/08*   (2006.01)
*G06F 1/3296* (2019.01)

(52) U.S. Cl.
CPC .............. *G06F 1/324* (2013.01); *G06F 1/08* (2013.01); *G06F 1/3296* (2013.01); *G06F 9/4405* (2013.01)

(58) Field of Classification Search
None
See application file for complete search history.

(56) References Cited

U.S. PATENT DOCUMENTS

| | | | |
|---|---|---|---|
| 7,467,318 B2 * | 12/2008 | Bruno | G06F 1/206 713/500 |
| 7,469,355 B1 * | 12/2008 | Chong | G06F 1/206 713/600 |
| 9,021,324 B2 | 4/2015 | Chawla et al. | |
| 9,026,842 B2 * | 5/2015 | Winger | G06F 11/0793 713/324 |
| 2004/0267483 A1 | 12/2004 | Percer et al. | |
| 2009/0006901 A1 * | 1/2009 | Brey | G06F 1/206 714/47.1 |
| 2013/0046999 A1 * | 2/2013 | Jung | G06F 1/206 713/300 |
| 2014/0006818 A1 * | 1/2014 | Doshi | G06F 1/3203 713/320 |

(Continued)

OTHER PUBLICATIONS

International Search Report and Written Opinion from PCT/US2019/014828 dated Apr. 17, 2019, 17 pgs.

*Primary Examiner* — Danny Chan
(74) *Attorney, Agent, or Firm* — Green, Howard & Mughal LLP

(57) ABSTRACT

An apparatus is provided which comprises: a power management circuitry; and a processing circuitry comprising a processing core, wherein the power management circuitry is to: compute first voltage and frequency parameters, and transmit the first voltage and frequency parameters to the processing circuitry for operation of the processing core, and wherein in response to a detection of a fault, the power management circuitry is to: access second voltage and frequency parameters from a memory, and transmit the accessed second voltage and frequency parameters to the processing circuitry for operation of the processing core.

14 Claims, 7 Drawing Sheets

(56) References Cited

U.S. PATENT DOCUMENTS

| | | | |
|---|---|---|---|
| 2014/0060773 A1* | 3/2014 | Wajima | G06F 1/20 165/11.1 |
| 2014/0149762 A1* | 5/2014 | Allen-Ware | G06F 1/3296 713/320 |
| 2014/0225441 A1* | 8/2014 | Mizuno | B60L 58/30 307/66 |
| 2014/0232333 A1* | 8/2014 | Kim | H02J 50/10 320/108 |
| 2014/0321165 A1 | 10/2014 | Sanchez et al. | |
| 2015/0019788 A1 | 1/2015 | Adler et al. | |
| 2015/0082076 A1* | 3/2015 | Jagmag | G06F 1/04 713/600 |
| 2016/0252942 A1* | 9/2016 | Varma | G06F 1/263 713/322 |
| 2016/0314095 A1* | 10/2016 | Park | G06F 1/3206 |
| 2017/0168516 A1 | 6/2017 | King | |
| 2017/0272073 A1* | 9/2017 | Betz | H03K 19/00369 |
| 2018/0052506 A1* | 2/2018 | Kuo | G05F 1/26 |

* cited by examiner

US 10,732,699 B2

REDUNDANCY IN DISTRIBUTION OF VOLTAGE-FREQUENCY SCALING PARAMETERS

BACKGROUND

In a computing device, a voltage supplied to a processing core and/or a frequency of a clock signal supplied to the processing core may be dynamically scaled during an operation of the processing core. An arrangement may, for example, dynamically compute the voltage and/or the frequency, e.g., based on a workload of device, a temperature of the device, power available to the device, etc. In case the arrangement develops a fault, no voltage-frequency scaling may be performed, thereby potentially rendering the device non-operational.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
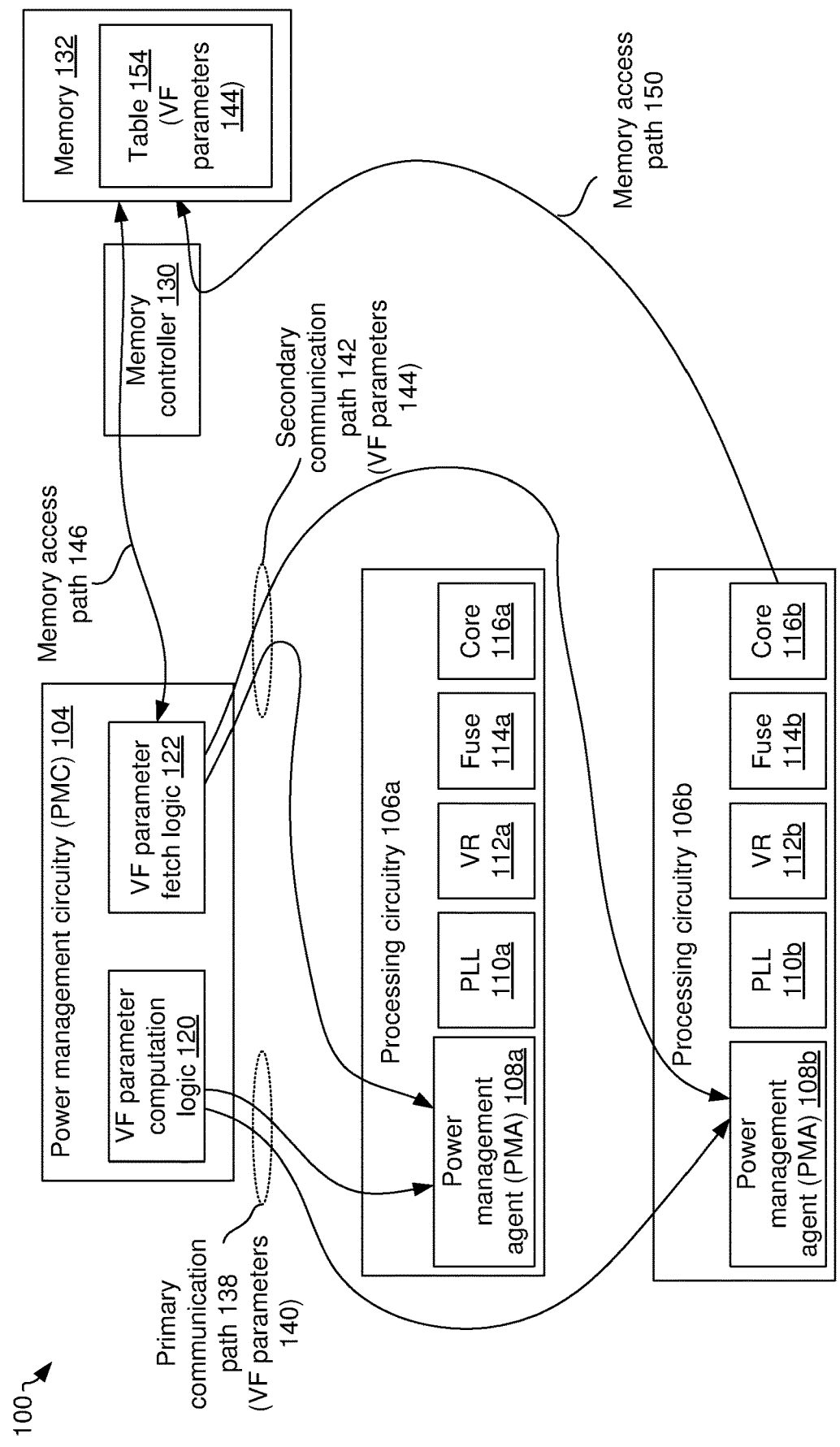
FIG. 1 illustrates a device comprising a primary arrangement and a backup (or secondary) arrangement for distributing voltage-frequency parameters (e.g., operating voltage and/or operating frequency parameters, also referred to as VF parameters) to various processing circuitries, according to some embodiments.

In some embodiments, in a device, a voltage supplied to a processing core and/or a frequency of a clock signal supplied to the processing core may be dynamically scaled during an operation of the processing core. During a normal mode of operation of the device, a primary arrangement may dynamically compute the voltage and/or the frequency, e.g., based on a workload of device, a temperature of the device, power available to the device, configuration of the device, etc.

In case the primary arrangement develops a fault (referred to as a faulty mode of operation), a secondary arrangement may be triggered. For example, during booting the device, candidate voltage-frequency (VF) parameters may be stored in a memory of the device. During the faulty mode of operation, the secondary arrangement may fetch one or more VF parameters from the memory, and may transmit the VF parameters to the processing core, e.g., to enable voltage-frequency scaling of the processing core.

In an example, the VF parameters stored in the table in the memory and used during the faulty mode of operation may be relatively less optimal compared to the VF parameters dynamically computed during the normal mode. However, the sub-optimal VF parameters from the memory may keep the device operational (e.g., with some compromise in performance), and the device may not fail outright in response to the fault in the primary arrangement. The secondary arrangement may comprise a bridge controller. In some embodiments, the bridge controller may be used for testing the secondary arrangement, e.g., to ensure that the secondary arrangement is operational. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C). The terms "left," "right," "front," "back," "top," "bottom," "over," "under," and the like in the description and in the claims, if any, are used for descriptive purposes and not necessarily for describing permanent relative positions.

FIG. 1 illustrates a device 100 comprising a primary arrangement and a backup (or secondary) arrangement for distributing voltage-frequency parameters (e.g., operating voltage and/or operating frequency parameters, also referred to as VF parameters) to various processing circuitries 106a, 106b, according to some embodiments. The device 100 may be any appropriate computing device comprising one or more processing cores, and circuitries to scale the operating voltage and/or the operating frequency of the one or more processing cores.

In some embodiments, a Power Management Circuitry (PMC) 104 of the device 100 transmits VF parameters 140 to the processing circuitries 106a, 106b using the primary arrangement. In case of a failure of at least a part of the primary arrangement, the PMC 104 transmits VF parameters 144 to the processing circuitries 106a, 106b using the backup arrangement.

Although merely two processing circuitries 106 are illustrated in FIG. 1, the device 100 may include a larger number of such processing circuitries, e.g., 4, 8, 16, 32, 64 or even higher number of processing circuitries 106. Elements referred to herein with a common reference label followed by a particular number or alphabet may be collectively referred to by the reference label alone. For example, processing circuitries 106a, 106b may be collectively and generally referred to as processing circuitries 106 in plural, and processing circuitry 106 in singular.

In some embodiments, the processing circuitry 106a comprises a processing core (also referred to as core) 116a, a Power Management Agent (PMA) 108a to control one or more aspects of operation of the core 116a, a phase locked loop (PLL) 110a, a voltage regulator 112a (e.g., a fully integrated voltage regulator or FIVR 112a), a fuse 114a, etc. Similarly, the processing circuitry 108b comprises corresponding components, as illustrated in FIG. 1. Although a processing circuitry 106 may include various other components (e.g., a cache, a communication interface, etc.), such components are not illustrated in FIG. 1 for purposes of illustrative clarity, and to not obfuscate the teachings of this disclosure.

In some embodiments, the PMC circuitry 104 may comprise a VF parameter computation logic 120 (also referred to herein as calculation logic 120) that may compute or calculate voltage and/or frequency operating points (e.g., operating voltage and/or frequency) of various processing circuitry 106. For example, such calculation may be based on a workload of the device 100, a temperature of the device 100, a battery charge level and/or power available to the device 100, a configuration of the device 100, a setting of the fuse 114 of a processing circuitry 106 (e.g., where the fuse setting may indicate a configuration of the corresponding processing circuitry), and/or various other parameters. Such VF parameters may be dynamically updated by the computation logic 120, e.g., in response to a change in the operating conditions of the device 100.

Merely as an example, the computation logic 120 may select a voltage V11 and a frequency f11 for the processing core 116a during a first time-period. During a second time-period, based on a change in the workload, the computation logic 120 may select a voltage V12 and a frequency f12 for the processing core 116a. Thus, the voltage V11 and the frequency f11 are VF parameters for the processing core 116a for the first time-period, and the voltage V12 and the frequency f12 are VF parameters for the processing core 116a for the second time-period. Similarly, the computation logic 120 may select appropriate voltage and/or frequency for the processing core 116b (and for any other processing cores) during the first and second time periods. As an example, the computation logic 120 may select a voltage V21 and a frequency f21 for the processing core 116b during the first time-period, and the computation logic 120 may select a voltage V22 and a frequency f22 for the processing core 116b during the second time-period. Thus, the voltage V21 and the frequency f21 are VF parameters for the processing core 116b for the first time-period, and the voltage V22 and the frequency f22 are VF parameter for the processing core 116b for the second time-period.

In an example, the device 100 is assumed to operate in a normal mode of operation when various components of the device 100 are operating without developing any fault. The VF parameters computed by the computation logic 120 during the normal mode of operation are also referred to as VF parameters 140.

In an example, the device 100 is assumed to operate in a faulty mode of operation when one or more components of the device 100 are detected to have developed some fault, as discussed herein later. The VF parameters used during the faulty mode of operation are also referred to as VF parameters 144.

In some embodiments, during the normal mode of operation of the device 100 (e.g., when various components of the device 100 are operating without developing any fault), the PMC 104 (e.g., the computation logic 120) may transmit the VF parameters 140 to the various processing circuitries 106, e.g., via a primary communication path 138.

For example, in the above discussed example, the voltage V11 and the frequency f11 are VF parameter for the processing core 116a for the first time-period, and the voltage V12 and the frequency f12 are VF parameter for the processing core 116a for the second time-period. Also, the voltage V21 and the frequency f21 are VF parameter for the processing core 116b for the first time-period, and the voltage V22 and the frequency f22 are VF parameter for the processing core 116b for the second time-period. Assuming that the first and second time-periods occur during the normal mode of operation, the PMC 104 (e.g., the computation logic 120) transmits the voltage V11 and the frequency f11 to the processing circuitry 106a during the first time-period over the primary communication path 138; and the PMC 104 transmits the voltage V12 and the frequency f12 to the processing circuitry 106a during the second time-period over the primary communication path 138. Similarly, the PMC 104 (e.g., the computation logic 120) transmits the voltage V21 and the frequency f21 to the processing circuitry 106b during the first time-period over the primary communication path 138; and the PMC 104 transmits the voltage V22 and the frequency f22 to the processing circuitry 106b during the second time-period over the primary communication path 138.

In some embodiments, a PMA 108 of a processing circuitry 106 (e.g., the PMA 108a of the processing circuitry 106a) receives the VF parameters from the PMC 104, and operates the corresponding processing core 116 based on the received VF parameters. For example, for the above discussed example of voltages V11 and V12 and frequencies f11 and f12, the PMA 108a causes the PLL 110a to supply a clock to the core 116a at frequencies f11 and f12 during the first and second time-periods, respectively. Also, the PMA 108a causes the VR 112a to supply a voltage signal to the core 116a at voltages V11 and V12 during the first and second time-periods, respectively. The PMA 108b similarly causes the PLL 110b to supply a clock to the core 116b at frequencies f21 and f22 during the first and second time-periods, respectively. Also, the PMA 108b causes the VR 112b to supply a voltage signal to the core 116b at voltages V21 and V22 during the first and second time-periods, respectively.

In an example, as the computation logic 120 and the primary communication path 138 is to compute and transmit the VF parameters 140 to the processing circuitries 106 during the normal mode of operation of the device 100, the computation logic 120 and the primary communication path 138 are assumed to be part of the primary arrangement to deliver VF parameters to the processing circuitries 106. Thus, the primary arrangement is to deliver the VF parameters 140 to the processing circuitries 106 during the normal mode of the device 100.

The computation logic 120 comprises hardware, software, and/or firmware. In an example, the computation logic 120 is usually a complex logic which may develop a fault during testing the device 100, and/or after the device 100 is sold and deployed at a customer location, as a result of which the computation logic 120 may not be able to compute the VF parameters 140. In another example, one or more faults in the device 100 may prohibit the computation logic 120 from receiving sufficient information to effectively compute the VF parameters 140 (e.g., the computation logic 120 may not receive workload information of the device 100, may not receive temperature measurements of the device 100, may not receive configuration settings from the fuses 114, and/or the like). In yet another example, one or more faults in the device 100 may allow the computation logic 120 to generate the VF parameters 140, but prohibit the computation logic 120 to effectively transmit the VF parameters 140 to the processing circuitries 106. These are some examples of fault conditions of the device 100.

When the device 100 develops one or more fault conditions, the device 100 operates in a faulty mode of operation. In some embodiments, when the device 100 operates in the faulty mode of operation, the PMAs 108 are unable to receive the VF parameters 140 from the computation logic 120 via the primary communication path 138. For example, the computation logic 120 is unable to effectively generate the VF parameters 140 and/or is unable to effectively transmit the VF parameters 140 to the PMAs 108.

If a conventional device develops such fault(s), processing circuitries of the conventional device would not receive VF parameters, as a result of which operating voltage and/or frequency of processing cores may not be determined. As a result, the conventional device may possibly be rendered inoperable.

In some embodiments, in the device 100, upon entering the faulty mode, a secondary or backup arrangement may be triggered, where the backup arrangement may access and transmit VF parameters to the processing circuitries 106. The VF parameters transmitted to the processing circuitries 106 (e.g., to the PMAs 108) during the faulty mode are also referred to as VF parameters 144.

For example, during booting of the device 100, as a part of the boot-up process, a core 116 (e.g., the core 116b) may store the VF parameters 144 in a memory 132 (e.g., via a memory access path 150 and via a memory controller 130). For example, the VF parameters 144 may be stored in the form of a table 154, e.g., a look-up table (LUT) 154.

Merely as an example, each row of the table 154 may list various operating conditions and a corresponding VF parameter. For example, a first row of the table 154 may specify that for a certain range of workloads (e.g., workload between 60-70% of rated workload) and for a temperature range of T1 to T2, the core 116a may operate at Va voltage and fa frequency, and the core 116b may operate at Vb voltage and fb frequency—these may be referred to as VF parameters VF 144a. Similarly, a second row of the table 154 may specify other operating conditions and another corresponding VF parameters, referred to as VF parameters VF 144a. Various other rows of the table 154 may similar list other operating conditions and other corresponding VF parameters.

In some embodiments and contrary to the illustration of FIG. 1, the VF parameters 144 may not be stored in the form of a table (e.g., the table 154), but in a different form (e.g., in the form of a graph, a curve, a mathematical expression, and/or the like). For sake of simplicity and without limiting the scope of this disclosure, it is assumed herein that the VF parameters 144 are stored in the memory 132 in the form of the table 154.

In an example, the table 154 may be generated by the computation logic 120, and/or may be preloaded in the device 100, e.g., as a part of the BIOS (Basic Input/Output System). In another example, the table 154 may be received by the device 100 as a part of a software update and/or a firmware update. In an example, such a software and/or firmware update may be received by the device 100 (e.g., from a service provider or manufacturer of the device 100), in response to a detection of fault in the device 100 (e.g., in response to the device 100 entering the faulty mode), or as a part of a regular scheduled update. The core 116b may load the table 154 in the memory 132 during a boot-up or initialization process of the device 100.

During the normal mode, the computation logic 120 may dynamically calculate the VF parameters 140, which may be substantially optimal (or near optimal) for the operating condition of the device 100. The VF parameters 144 stored in the table 154 may not be optimal—but these parameters may be somewhat near optimal or sub-optimal. For example, the VF parameters 144 stored in the table 154 may be used in response to the processing circuitries 106 unable to receive the optimal or near optimal VF parameters 140 generated by the computation logic 120.

In some embodiments, the PMC 104 comprises a VF parameter fetch logic 122 (also referred to as fetch logic 122). During the faulty mode of operation, the fetch logic 122 may selectively fetch VF parameters from the table 154 (e.g., fetch VF parameters 144a from the first row of the table, based on operating conditions, workloads, temperature, etc. of the device 100), e.g., via the memory access path 146. Subsequently, the fetch logic 122 may transmit the fetched VF parameters 144 to the processing circuitries 106, e.g., via a secondary communication path 142 (or via the primary communication path 140, e.g., if the primary communication path 140 is operational).

Thus, in some embodiments, upon detection of a fault in the computation logic 120 and/or the primary communication path 138, the device 100 triggers the secondary arrangement to transmit the VF parameters 144 to the processing circuitries 106. This may prevent the device 100 from completely failing to work—rather, the device 100 may still function, albeit at sub-optimal voltage and/or frequency. Thus, although the VF parameters 144 may not be optimal or near optimal (e.g., compared to the optimal or near optimal VF parameters computed by the computation logic 120), the secondary arrangement may prevent immediately failure of the device 100, and may allow the device 100 to operate at possibly a reduced performance level. In contrast, in a conventional device, upon development of a fault in components transmitting VF parameters to the processing cores, the conventional device may have complete failure and may be non-operational.

In some embodiments, while the device 100 operates in the faulty mode of operation, if the fault is software or firmware related, the software and/or the firmware may be updated in due course. In some embodiments, while the device 100 operates in the faulty mode of operation, if the fault is hardware related, the defective component(s) may be repaired or replaced in due course. However, before the fault in rectified, due to the secondary arrangement discussed herein, the device 100 may still operate, although possibly at a sub-optimal performance level.

Figure 2:
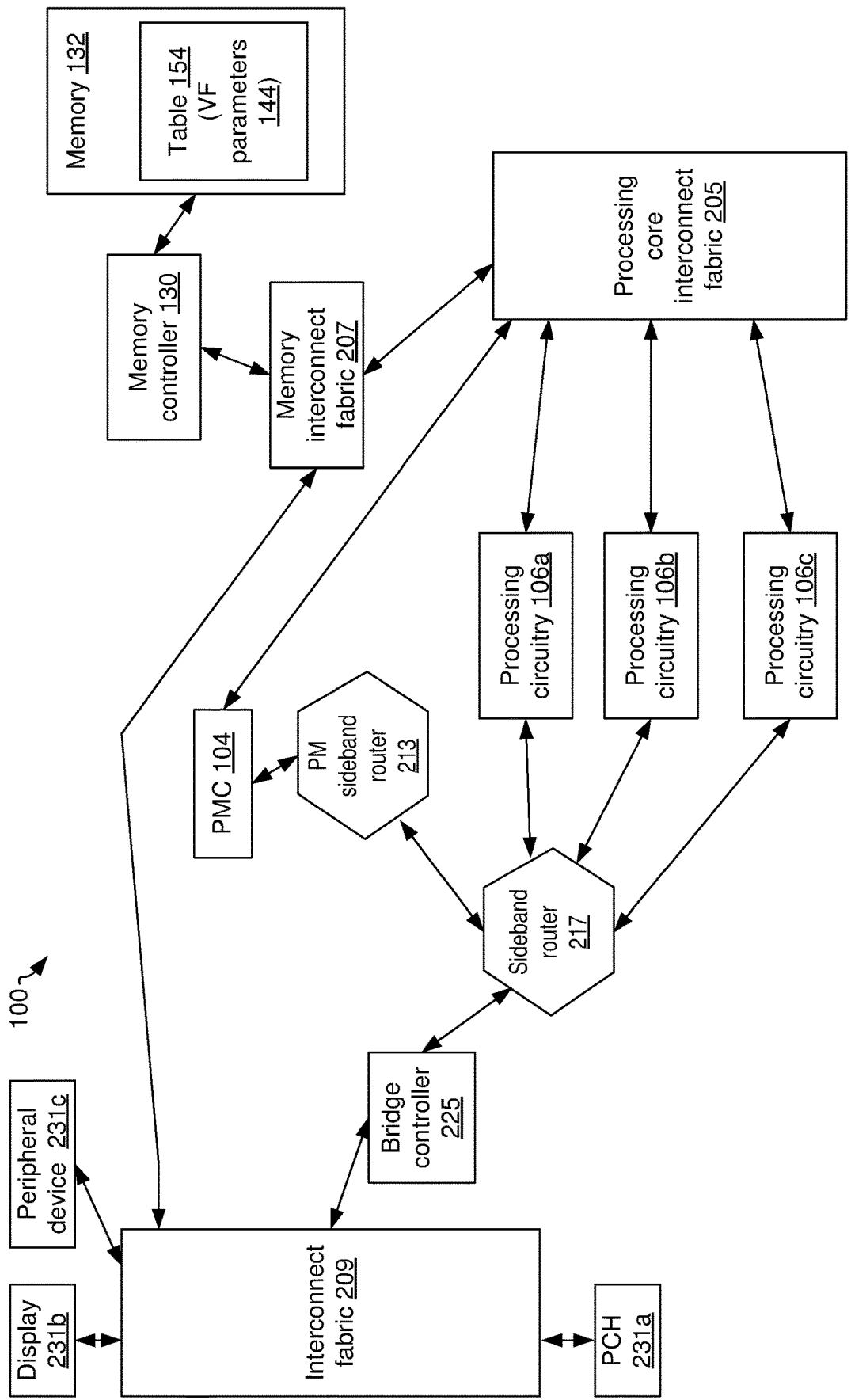
FIG. 2 illustrates an example implementation of the device of FIG. 1, according to some embodiments.

FIG. 2 illustrates an example implementation of the device 100 of FIG. 1, according to some embodiments. For example, FIG. 2, among other things, illustrates example implementation of various communication paths (e.g., paths 138, 146, 142, 150, etc.) of the device 100 of FIG. 1.

In FIG. 2, for purposes of illustrative clarity, the processing circuitries 106 (e.g., processing circuitries 106a, 106b, 106c) are illustrated, without illustrating the components within the processing circuitries 106. Similarly, In FIG. 2, the PMC 104 is illustrated, without illustrating the components within the PMC 104.

In some embodiments, the processing circuitries 106 and the PMC 104 may be communicatively coupled to a processing core interconnect fabric 205 (also referred to as fabric 205). The fabric 205 may comprises one or more routers, traces, communication links, buses, etc. The PMC 104 may communicate with the processing circuitries 106 via the fabric 205. For example, the PMC 104 may transmit the VF parameters 140 to the processing circuitries 106 via the fabric 205 during the normal mode of operation of the device 100. Thus, the fabric 205 may be a part of the primary communication path 128 of FIG. 1.

In some embodiments, the fabric 205 is also coupled to the memory 132 via a memory interconnect fabric 207 (also referred to as fabric 207) and the memory controller 130. For example, the cores 116 may access of the memory 132 via the fabrics 205 and 207. Thus, the combination of the fabrics 205 and 207 may be a part of the memory access path 150 of FIG. 1. For example, the core 116 may store the table 154 in the memory 132 via the fabrics 205, 207, and the memory controller 130.

In some embodiments, the device 100 comprises a Power Management (PM) sideband router 213 and a sideband router 217, which are also referred to as routers 213 and 217, respectively. In an example, the routers 213 and 217 may be combined to form a combined single router.

In some embodiments, the PMC 104 may be communicatively coupled to the router 217 via the router 213. In some embodiments, the router 217 may also be communicatively coupled to the processing circuitries 106. Thus, the PMC 104 may communicate with the processing circuitries 106 via the routers 213 and 217. In an example, the routers 213 and 217 between the PMC 104 and the processing circuitries 106 may be a part of the secondary communication path 142 of FIG. 1. For example, the PMC 104 may transmit the VF parameters 144 to the processing circuitries 106 via the routers 213 and 217 during the faulty mode of operation of the device 100.

In some embodiments, the device 100 comprises a bridge controller 225 (also referred to as controller 225) and an interconnect fabric 209 (also referred to as fabric 209). The router 217 may be communicatively coupled to the fabric 207 via the controller 225 and the fabric 209. Thus, the routers 213, 217, the controller 225, the fabric 209, and the fabric 207 may be a part of the memory access path 146 of FIG. 1. For example, the PMC 104 may fetch the VF parameters 144 from the memory 132 via the routers 213, 217, the controller 225, the fabric 209, and the fabric 207, e.g., during the faulty mode of operation of the device 100.

The fabric 209 may communicatively couple and interconnect various other components of the device 100. Merely as an example, the fabric 209 may communicatively interconnect a Platform Controller Hub (PCH) 231a, a display 231b, one or more peripheral devices 231c (e.g., a camera), and/or the like.

In some embodiments, the fabric 205 and the fabric 207 may be used by the cores 116 to access the memory 132. Accordingly, in some embodiments, the fabric 205 and the fabric 207 may be high speed interconnect fabrics. For example, the fabric 205 and/or the fabric 207 may be substantially faster than the router 213, the router 217, the controller 225, and/or the fabric 209.

Figure 3:
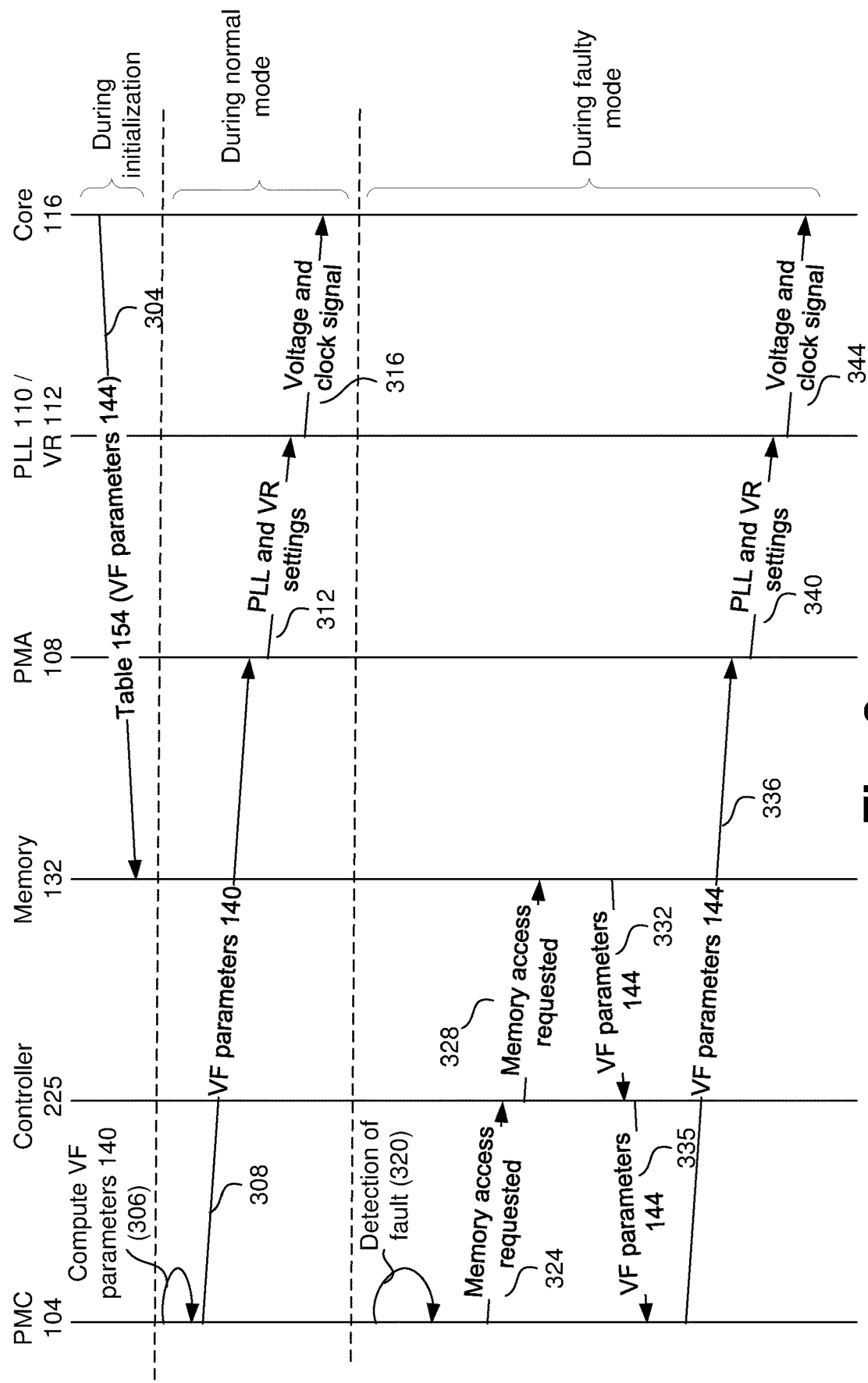
FIG. 3 illustrates a data flow schematics illustrating actions associated with transmission of VF parameters during a normal mode of operation and during a faulty mode of operation of the device of FIGS. 1-2, according to some embodiments.

FIG. 3 illustrates data flow schematics illustrating actions associated with transmission of VF parameters during the normal mode of operation and during the faulty mode of operation of the device 100 of FIGS. 1-2, according to some embodiments. For example, FIG. 3 illustrates data flow among the PMC 104, the controller 225, the memory 132, a PMA 108, a combination of a corresponding PLL 110 and a corresponding VR 112, and a corresponding core 116.

FIG. 3 is divided in three sections (e.g., by two dotted lines)—a first section depicting actions during an initialization of the device 100, a second section depicting actions during the normal mode of the device 100, and a third section depicting actions during the faulty mode of the device 100.

At 304, during initialization of the device, a core 116 (e.g., the core 116b, as illustrated in FIG. 1) may store the table 154 in the memory 132, e.g., as a part of the boot-up process of the device 100. For example, the core 116 may store the table 154 to the memory 132 via the memory access path 150 (e.g., which may include the fabrics 205 and 207). In some other examples, however, the core 116 may store the table 154 at another time (e.g., in response to a detection of a fault).

During the normal mode of operation, at 306, the PMC 104 (e.g., the computation logic 120) may dynamically compute the VF parameters 140. At 308, the PMC 104 may transmit the VF parameters 140, via the primary communication path 138 (e.g., comprising the fabric 205), to a PMA 108 (e.g., the PMA 108a). At 312, the PMA 108 (e.g., the PMA 108a) may determine the settings of the corresponding PLL 110 and/or the corresponding VR 112 (e.g., PLL 110a and/or the VR 112a), based on the received VF parameters 140; and may transmit the PLL and/or VR settings to the corresponding PLL 110 and/or the corresponding VR 112. AT 316, the PLL 110 may generate a clock signal based on the PLL setting, and transmit the clock signal to the corresponding core 116. Also, the VR 112 may generate a voltage signal based on the VR setting, and transmit the voltage signal to the corresponding core 116.

In an example, the operations at 306, 308, 312, and 316 may be repeated, e.g., whenever the computation logic 120 dynamically computes new VF parameters at 306, e.g., based on changes in operating conditions of the device 100 (e.g., changes in one or more of a workload of the device 100, a temperature of the device 100, power available for operation of the device 100, and/or the like). In an example, the operations at 306, 308, 312, and 316 may be repeated, until a fault is detected, until the device 100 enters a low power mode or an off mode, etc.

At 320, a fault may be detected by the PMC 104, and the device 100 may enter the faulty mode of operation. The fault may be one or more of the faults discussed in this disclosure.

Upon detection of the fault, the PMC 104 (e.g., the fetch logic 122) may want to fetch one or more VF parameters 144 from the table 154 stored in the memory 132. Accordingly, at 324, the PMC 104 may transmit a memory access request (e.g., which may be a memory read request) to the controller 225. At 328, the controller 225 may relay the request to the memory 132.

In some embodiments, the fabric 209 may arbitrate communication through the fabric 209, and may provide access to the fabric based on such arbitration. For example, components 231a, 231b, 231c, controller 225, and/or any other appropriate components communicatively coupled to the fabric may request to communicate via the fabric 209, and the fabric 209 may arbitrate between such requests. In some embodiments, the memory access request from the controller 225 may have a higher priority associated with it, e.g., so that the fabric 209 may prioritize (e.g., during the arbitration) transmission of the memory access request to the memory 132.

At 332, the memory 132 transmits the VF parameters 144 to the controller 225 (e.g., via the memory controller 130, the fabric 207, and the fabric 209). At 335, the controller 225 transmits the VF parameters 144 to the PMC 104.

At 336, the PMC 104 transmits the VF parameters 144 to one or more PMAs 108. At 340, individual PMA 108 may then transmit corresponding PLL and/or VR settings to the corresponding PLL 110 and/or the corresponding VR 112, based on the VF parameters 144 (e.g., as discussed with respect to 312). AT 344, the PLL 110 may generate a clock signal based on the PLL setting, and transmit the clock signal to the corresponding core 116 (e.g., as discussed with respect to 316). Also, the VR 112 may generate a voltage signal based on the VR setting, and transmit the voltage signal to the corresponding core 116 (e.g., as discussed with respect to 316).

Figure 4:
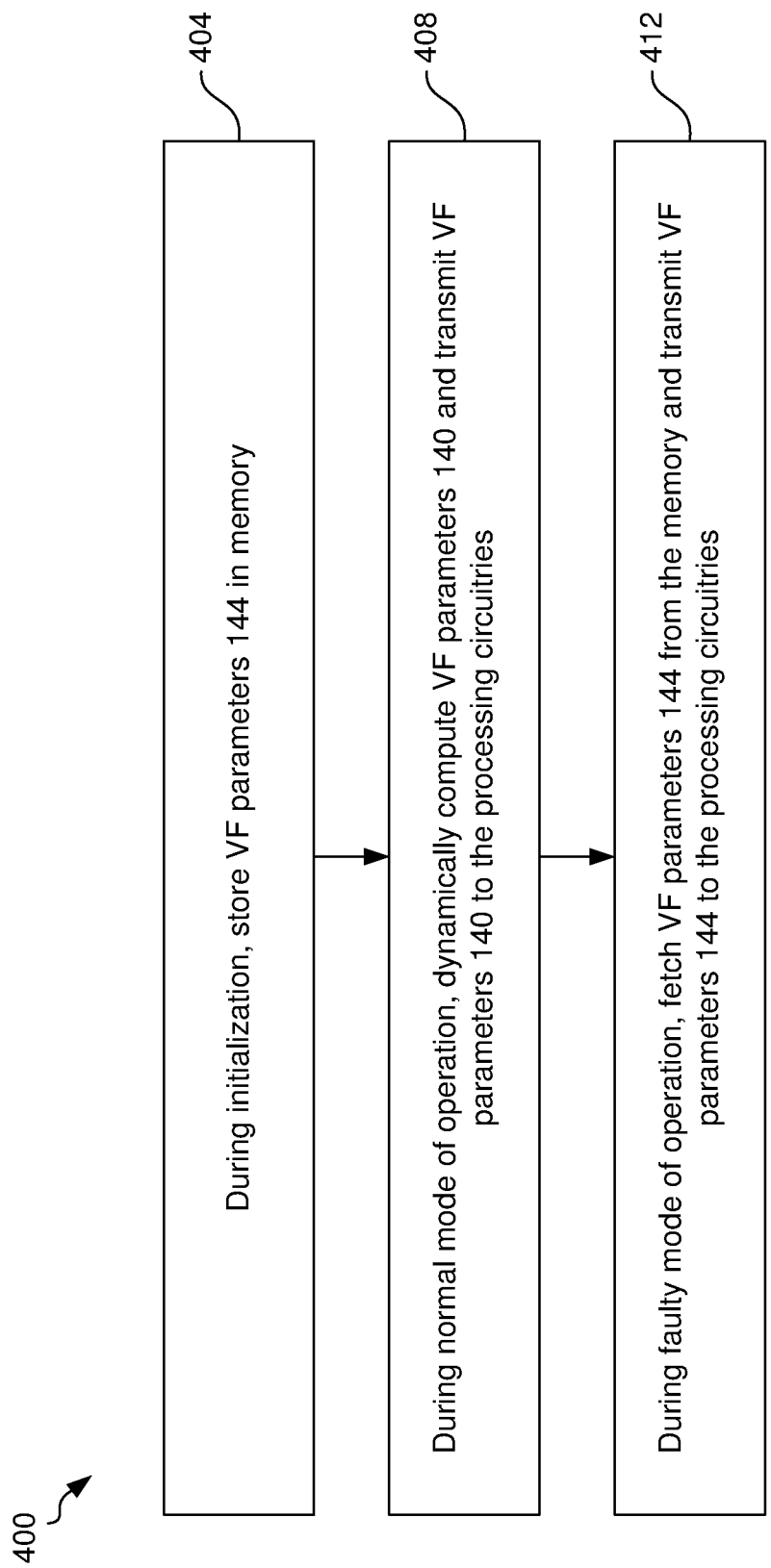
FIG. 4 illustrates a flowchart depicting a method for operating a primary arrangement and a backup (or secondary) arrangement for distributing voltage-frequency parameters to various processing circuitries, according to some embodiments.

FIG. 4 illustrates a flowchart depicting a method 400 for operating a primary arrangement and a backup (or secondary) arrangement (e.g., in the device 100) for distributing voltage-frequency parameters to various processing circuitries, according to some embodiments. Although the blocks in the flowchart with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 may be optional in accordance with certain embodiments. The numbering of the blocks presented is for the sake of clarity and is not intended to prescribe an order of operations in which the various blocks must occur.

At 404, during initialization of the device 100, VF parameters 144 may be stored (e.g., by a processing core 116) in a memory (e.g., memory 130), e.g., as discussed in further details with respect to action 144 of FIG. 3.

At 408, during normal mode of operation, VF parameters 140 may be dynamically computed (e.g., by the computation logic 120) and transmitted to the processing circuitries 106, e.g., as discussed in further details with respect to actions 308, 312, and 316 of FIG. 3.

At 412, during the faulty mode of operation, VF parameters 144 may be fetched (e.g., by the fetch logic 122) from the memory 132, and transmitted to the processing circuitries 106, e.g., as discussed in further details with respect to actions 320, . . . , 344 of FIG. 3.

Figure 5:
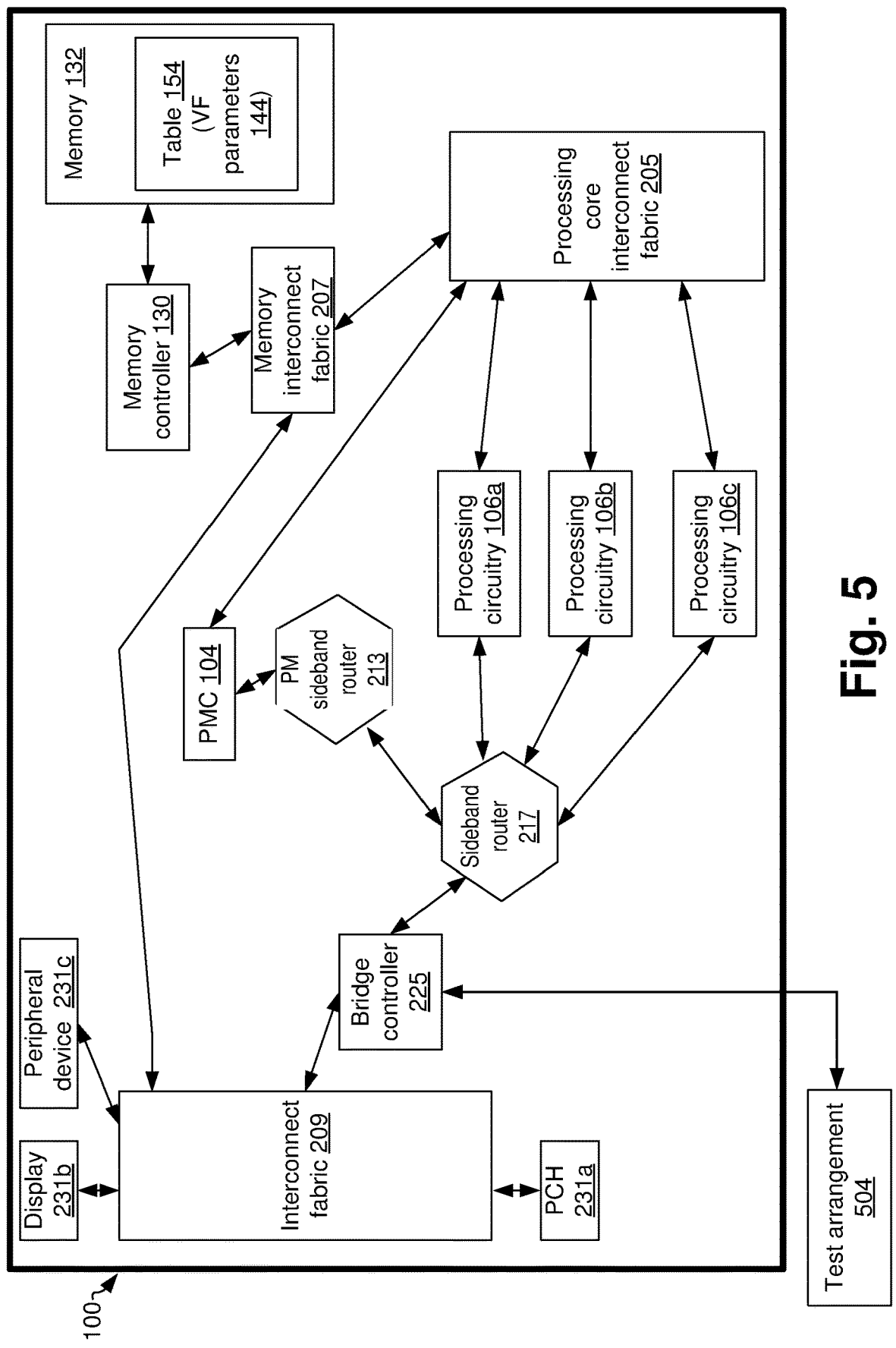
FIG. 5 illustrates a test arrangement coupled to the device of FIGS. 1-2, e.g., to test a secondary arrangement for transmission of VF parameters, according to some embodiments.

FIG. 5 illustrates a test arrangement 504 coupled to the device 100 of FIGS. 1-2 (e.g., to the controller 225), to test the secondary arrangement for transmission of the VF parameters 144, according to some embodiments. In some embodiments, the routers 213, 217, the controller 225, various connections between these routers and other components (e.g., the connections between the router 217 and the processing circuitries 106, and the connection between the router 213 and the PMC 104), the fabrics 209 and 207, etc. form the previously discussed secondary arrangement to transmit the VF parameters 144 from the memory 132 to the processing circuitries 106, e.g., in an event of one or more faults. It may be useful to ensure that that the secondary arrangement works as intended. In some embodiments, the test arrangement 504 (e.g., which may be external to the device 100) may test this secondary arrangement. In some embodiments, the test arrangement may comprise a tester that may be coupled to the controller 225 of the device 100.

In an example, the testing of the secondary arrangement, via the controller 225 and the test arrangement 504, may be performed after manufacturing the device 100, and before shipping the device 100 to a customer. In another example, the testing of the secondary arrangement may be performed in response to a detection of an occurrence of a fault, e.g., to identify the fault. In an example, the test arrangement 504 may be coupled to the controller 225 merely during testing of the secondary arrangement (e.g., and not necessarily during the normal mode or faulty mode of operation).

Figure 6:
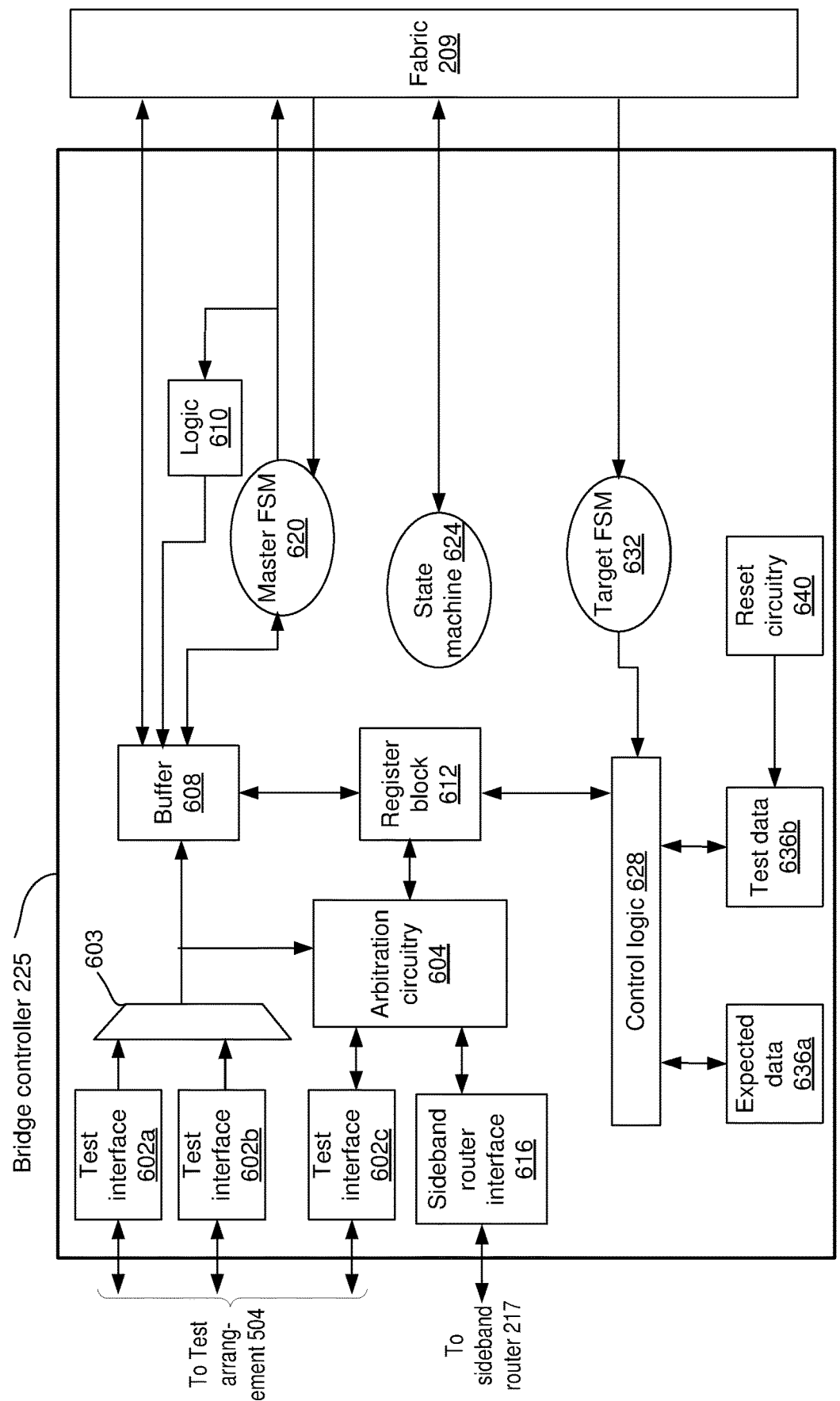
FIG. 6 illustrates a bridge controller of the device of FIGS. 1-2, where the bridge controller is used to test the secondary arrangement, and the bridge controller is also used to fetch the VF parameters from a memory, according to some embodiments.

FIG. 6 illustrates the bridge controller 225 of the device 100, where the bridge controller 225 is used to test the secondary arrangement, and the bridge controller 225 is also used to fetch the VF parameters 144 from the memory 132, according to some embodiments. In some embodiments, the controller 225 comprises test interfaces 602a, 602b, 602c, etc., e.g., to communicate with the test arrangement 504 of FIG. 5. For example, the test interfaces 602a, 602b, 602c may be compatible with different corresponding testing protocols. Based on one or more testing protocols supported by the test arrangement 504, corresponding one or more of the test interfaces 602a, 602b, 602c (also referred to as interfaces 602a, 602b, 602c, respectively) may be coupled to the test arrangement 504. In some embodiments, the controller 225 may receive test commands from the test arrangement 504 via one or more of the interfaces 602, and/or output test results to the test arrangement 504 via one or more of the interfaces 602.

Merely as examples and without limiting the scope of this disclosure, the interface 602a may support a JTAG (Joint Test Action Group) testing protocol. Merely as examples and without limiting the scope of this disclosure, the interface 602b may support a test access port (TAP) testing protocol. Similarly, the interface 602c may support a Standard Test Interface (STI), or a Narrow Test Interface (NTI), or another appropriate testing interface. Although three example test interfaces 602 are illustrated in FIG. 6, in some embodiments, the controller 225 may have a higher or lower number of test interfaces 602.

In some embodiments, the controller 225 may further comprise a sideband router interface 616 (also referred to as interface 616). The interface 616 is to interface between the controller 225 and the sideband router 217. Thus, for example, if the controller 225 is to communicate with the PMC 104 and/or the processing circuitries 106 (e.g., during testing, during transmission of the memory request to fetch the VF parameters 144, during transmission of VF parameters 144, and/or the like), such communication may be via the interface 616.

In some embodiments, the controller 225 comprises an arbitration circuitry 604 to arbitrate between the interfaces 602a, 602b, 602c, and 616. In an example, the interfaces 602a and 602 may be coupled to the arbitration circuitry 604 via a multiplexer 603. During the faulty mode and the normal mode, the test interfaces 602 may be non-operational (e.g., as the device 100 is transmitting VF parameters 140 or 144 to the processing circuitries 106, and no testing is being performed). Thus, during the faulty mode and the normal mode, the arbitration circuitry 604 may be non-operational, or may be operational to allow the interface 616 access to the controller 225.

During a test mode of operation of the device 100 (e.g., while the secondary arrangement is to be tested using the test arrangement 504), one or more of the interfaces 602a, 602b, 602c, and 616 may be operational. For example, the test arrangement 504 may communicate test requests, test results, and/or the like, with the controller 225 via one or more of the interfaces 602a, 602b, 602c. The controller 225 may transmit test data to various components (e.g., to the routers 217, 213, the PMC 104, the processing circuitries 106, etc.) via the interface 616, e.g., to test one or more of these components. Accordingly, during the test mode, the arbitration circuitries 604 may arbitrate between the interfaces 602a, 602b, 602c, 616.

In some embodiments, the controller 225 may be coupled to the fabric 209. For example, the controller 225 may comprise a buffer 608 to communicate data with the fabric 209. Examples of such data may include test data (e.g., used during testing of the fabrics 209 and 207), memory requests (e.g., while requesting VF parameters 144 from the memory 132), VF parameters 144, etc. In some embodiments, a register block 612 may store one or more configuration parameters associated with the controller 225, may issue one or more test commands, etc., as will be discussed in further detail herein.

In some embodiments, the controller 225 may comprise a state machine 624. In an example, the state machine 624 may be an idle state machine (ISM). In some embodiments, the state machine 624 may control as to when transactions are allowed on the fabric. In an example, the state machine 624 may provide a protocol for clock gating and credit initialization for the fabric 209. For example, the state machine 624 may set priority for accessing the fabric 209. As an example, during transmitting the memory request for fetching the VF parameters 144 from the memory 132, a priority to access the fabric 209 may be high. During testing, a priority to access the fabric 209 may be relatively low. In an example, the state machine 624 may negotiate credits or slots for using the fabric 209, etc.

The controller 225 may act as a master when the controller 225 is transmitting data to the fabric 209 (e.g., transmitting memory requests to the memory 132, transmitting test data over the fabric 209, etc.). The controller 225 may act as a target when the controller 225 is receiving data from the fabric 209.

In some embodiments, the device 100 comprises a master Finite State Machine (FSM) 620 and a logic 610. The logic 610 may be a FIFO unload pointer logic. The master FSM 620 may transmit a request onto the fabric 209 to access the fabric, e.g., when an "inject" command is received from the register block 612. The inject command may be to inject data onto the fabric 209. The master FSM 620 may also steer the logic 610, e.g., when a corresponding grant (e.g., a grant allowing access to the fabric 209) is received from the fabric 209. Upon the grant allowing access to the fabric 209, the logic 610 may cause data from the buffer 608 to be transmitted to the fabric 209.

In some embodiments, the controller 225 may comprise a target FSM 632 and a control logic 628. The target FSM 632 may poll for signals (e.g., cmd_put signals) from the fabric 209 targeting the controller 225. Based on receiving a cmd_put signal from the fabric 209 and based on a type of transaction (e.g., posted, non-posted, data, command, length of transaction, etc.), the target FSM 632 may enable the register block 612 to issue appropriate command, e.g., to enable the buffer 608 to receive the data from the fabric 209.

In some embodiments, during testing, the control logic 628 may receive test data 636b (e.g., from a component being tested), and the control logic 628 may also have access to expected data 636a. The test data 636b may comprise one or more signatures, e.g., one or more of a non-posted deterministic signature, a posted deterministic signature, a non-posted data deterministic signature, a posted data deterministic signature, a completion command deterministic signature, a completion data deterministic signature, and/or the like. The expected data 636a may comprises corresponding expected values of one or more these signatures. Upon receiving the test data 636b, the control logic 628 may compare the test data 636b and the expected data 636a, e.g., to determine if the components being tested are operating satisfactorily. A result of the testing may be transmitted to the test arrangement 504.

In an example, instead of (or in addition to) the comparison being performed by the control logic 628, the comparison may be performed by the test arrangement 504. For example, in such embodiments, the controller 225 may transmit the test data 636b to the test arrangement 504, and the test arrangement 504 may have the expected data 636a stored therein. The test arrangement 504 may compare the test data 636b and the expected data 636a, e.g., to determine if the components being tested are operating satisfactorily.

In some embodiments, the controller 225 may further comprise a reset circuitry 640 to reset the test data 636b, e.g., as the beginning of test, at an end of test, after testing a component and before testing another component, as a part of the test, and/or the like.

Figure 7:
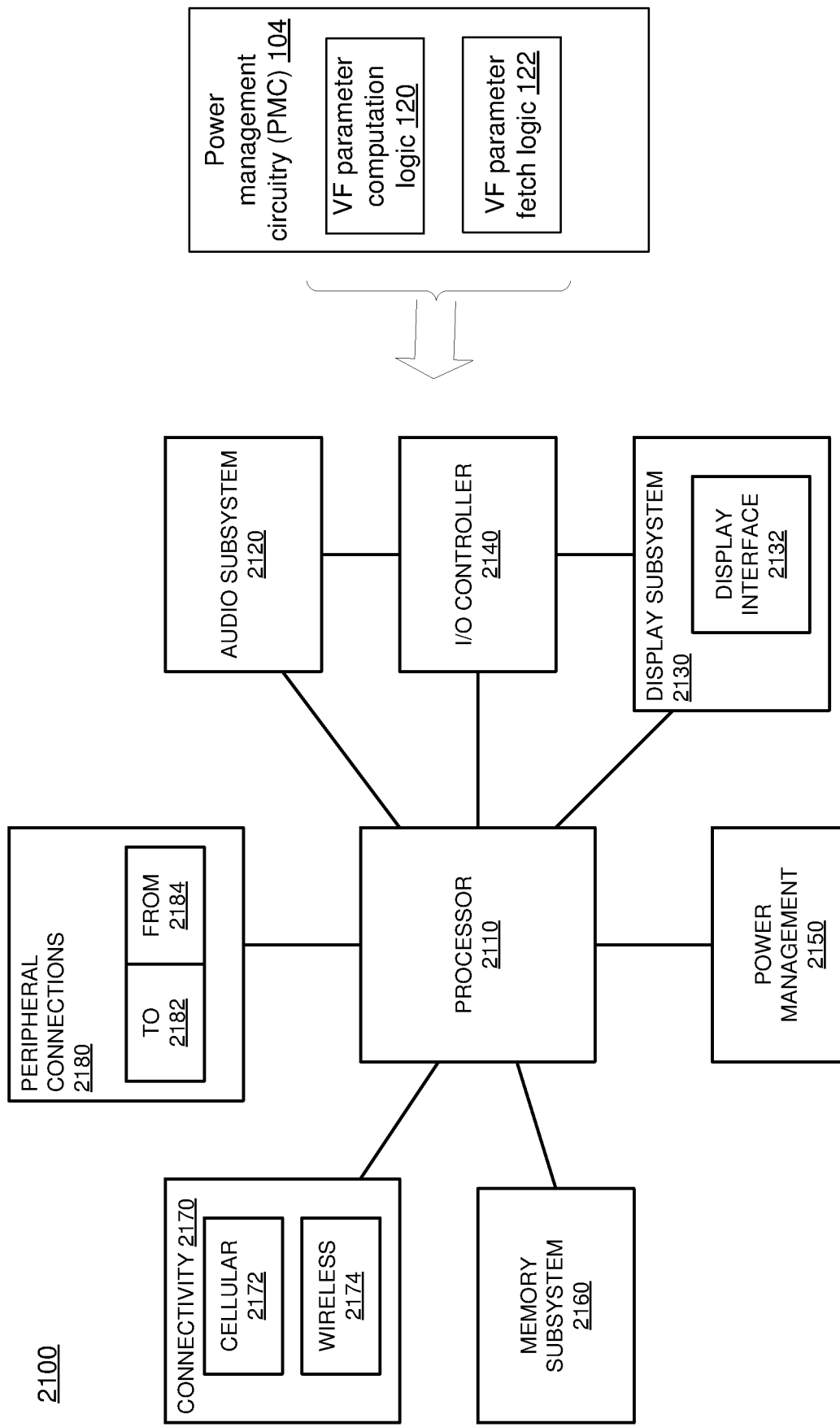
FIG. 7 illustrates a computing device, a smart device, a computing device or a computer system or a SoC (System-on-Chip), where the computing device may comprise a primary arrangement and a backup (or secondary) arrangement for distributing VF parameters to various processing circuitries, according to some embodiments.

FIG. 7 illustrates a computing device 2100, a smart device, a computing device or a computer system or a SoC (System-on-Chip) 2100, where the computing device 2100 may comprise a primary arrangement and a backup (or secondary) arrangement for distributing VF parameters to various processing circuitries, according to some embodiments. It is pointed out that those elements of FIG. 7 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an TOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may include the PMC 104 comprising the computation logic 120 and the fetch logic 122, and various other routers and fabrics and other components discussed with respect to FIGS. 1-6. In some embodiments, the memory subsystem 2160 may comprise the memory 132 storing the table 154. The computation logic 120 may transmit VF parameters 140 to the processing circuitries 106 (e.g., included in, or associated with the processor 2110) during the normal mode of operation, e.g., as discussed with respect to FIGS. 1-6. The fetch logic 122 may transmit VF parameters 144 to the processing circuitries 106 during the faulty mode of operation, e.g., as discussed with respect to FIGS. 1-6.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first circuitry comprising power management logic; and
a second circuitry comprising a processor core,
wherein the first circuitry is to: compute first voltage and frequency parameters, and transmit the first voltage and frequency parameters to the second circuitry for operation of the processor core, and
wherein in response to a detection of a fault, the first circuitry is to: access second voltage and frequency parameters from a memory, and transmit the accessed second voltage and frequency parameters to the second circuitry for operation of the processor core,
wherein the fault is to occur within the first circuitry, wherein the first circuitry is unable to receive temperature measurements of the apparatus during the fault, and wherein the fault is to prohibit the first circuitry from dynamically computing voltage and frequency parameters,
a first communication path between the first circuitry and the second circuitry; and
a second communication path between the first circuitry and the second circuitry, the second communication path being at least in part separate from the first communication path, wherein the first communication path is faster than the second communication path,
wherein the first circuitry is to transmit the first voltage and frequency parameters to the second circuitry via the first communication path, and
wherein the first circuitry is to transmit the second voltage and frequency parameters to the second circuitry via the second communication path.

2. The apparatus of claim 1, wherein the second circuitry comprises circuitry to:
receive the first voltage and frequency parameters, and the second first voltage and frequency parameters, and
control an operating voltage and an operating frequency of the processor core, based at least in part on the first voltage and frequency parameters, and the second voltage and frequency parameters.

3. The apparatus of claim 1, wherein the second circuitry comprises:
a phase locked loop (PLL) and a voltage regulator (VR),
wherein the PLL is to supply a clock signal at a first frequency to the processor core, based on the first voltage and frequency parameters, wherein the VR is to supply an input signal, having a first voltage, to the processor core, based on the first voltage and frequency parameters, wherein the PLL is to supply the clock signal at a second frequency to the processor core, based on the second voltage and frequency parameters, and wherein the VR is to supply the input signal, having a second voltage, to the processor core, based on the second voltage and frequency parameters.

4. The apparatus of claim 1, wherein:
the second communication path comprises one or more sideband routers.

5. The apparatus of claim 1, further comprising:
a third communication path between the first circuitry and the memory,
wherein in response to the detection of the fault, the first circuitry is to access the second voltage and frequency parameters from the memory via the third communication path.

6. The apparatus of claim 5, wherein the third communication path comprises:
a controller and an interconnect fabric,
wherein the controller is to negotiate access to the interconnect fabric.

7. The apparatus of claim 6, wherein:
the controller is to be coupled to a test arrangement external to the apparatus,
wherein the controller is to test one or more components of one or both of: the second communication path or the third communication path.

8. A system comprising:
a memory to store a plurality of voltage-frequency (VF) parameters;
a processor core coupled to the memory;
a wireless interface to allow the processor core to communicate with another system; and
a power management circuitry to:
while the system is to operate in a normal mode of operation, compute first VF parameters, and to cause the processor core to operate in accordance with the first VF parameters, and
while the system is to operate in a faulty mode of operation due to a fault, access second VF parameters of the plurality of VF parameters stored in the memory, and to cause the processor core to operate in accordance with the second VF parameters,
wherein the fault is to occur within the power management circuitry, wherein the power management circuitry is unable to receive temperature measurements of the system during the fault, and wherein the fault is to prohibit the power management circuitry from dynamically computing voltage and frequency parameters;
one or more routers communicatively coupled between the processor core and the power management circuitry, wherein the power management circuitry is to transmit the second VF parameters, and not the first VF parameters, via the one or more routers; and
a bridge controller communicatively coupled to the one or more routers, wherein the bridge controller is communicatively coupled to the memory via one or more interconnect fabrics.

9. The system of claim 8, further comprising:
a phase locked loop (PLL) and a voltage regulator (VR),
wherein the power management circuitry is to cause the PLL to supply a clock signal at a first frequency to the processor core and to cause the VR to supply an input signal having a first voltage to the processor core, based on the first VF parameters, and
wherein the power management circuitry is to cause the PLL to supply the clock signal at a second frequency to the processor core and to cause the VR to supply the input signal having a second voltage to the processor core, based on the second VF parameters.

10. The system of claim 8, wherein the bridge controller is communicatively coupled to a test arrangement that is external to the system.

11. The system of claim 8, wherein the bridge controller is to test one or more of:
the one or more routers,
a communication path between the bridge controller and the power management circuitry,
a communication path between the bridge controller and the processor core, or
a communication path between the power management circuitry and the processor core.

12. The system of claim 8, wherein the bridge controller is to test one or more of: the one or more interconnect fabrics, or a communication path between the bridge controller and the memory.

13. Non-transitory computer-readable storage media to store instructions that, when executed by a logic, cause a circuitry to:
compute first voltage-frequency (VF) parameters, and cause a component to operate in accordance with the first VF parameters, during a normal mode of operation; and
access second VF parameters from a memory, and cause the component to operate in accordance with the second VF parameters, during a faulty mode of operation;
store, during a boot-up process, the second VF parameters to the memory;
wherein a fault is to occur within the circuitry, wherein the circuitry is unable to receive temperature measurements during the fault, and wherein the fault is to prohibit the circuitry from dynamically computing voltage and frequency parameters;
transmit the first VF parameters to the component via a first communication path, wherein the circuitry and the communicate are coupled via a second communication path separate from the first communication path, wherein the first communication path is faster than the second communication path; and
transmit the second VF parameters to the component via the second communication path.

14. The non-transitory computer-readable storage media of claim 13, wherein the instructions cause the circuitry to:
detect the fault in computation of the first VF parameters; and
enter the faulty mode of operation, in response to the detection of the fault.

* * * * *